April 25, 1961  L. E. BUCK  2,981,101
HYDRAULIC LOAD CELL

Filed May 23, 1957  2 Sheets-Sheet 1

INVENTOR
L. E. BUCK
BY
*Richard of Geier*
ATTORNEYS

April 25, 1961 L. E. BUCK 2,981,101
HYDRAULIC LOAD CELL
Filed May 23, 1957 2 Sheets-Sheet 2
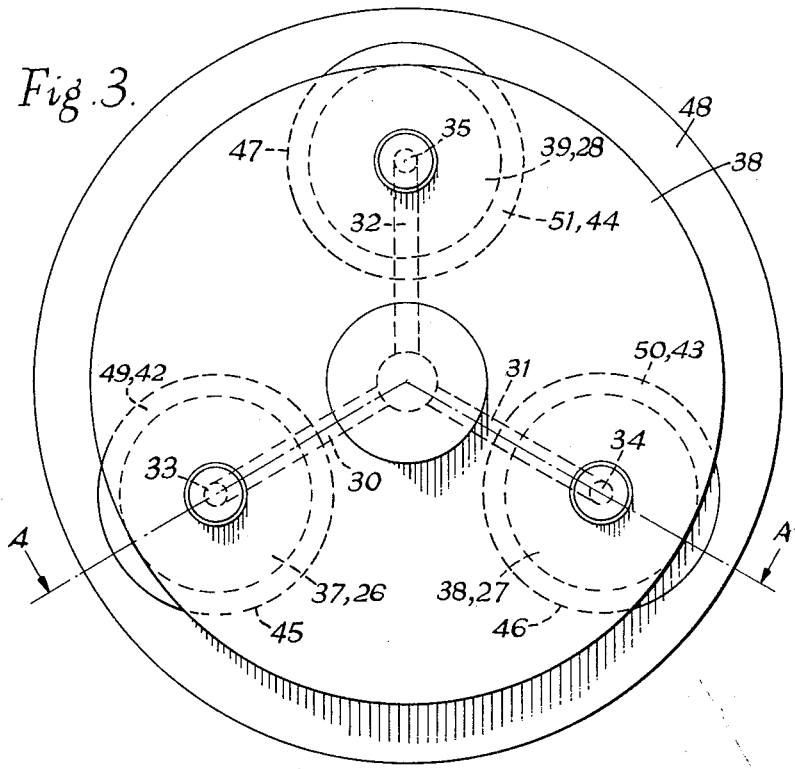
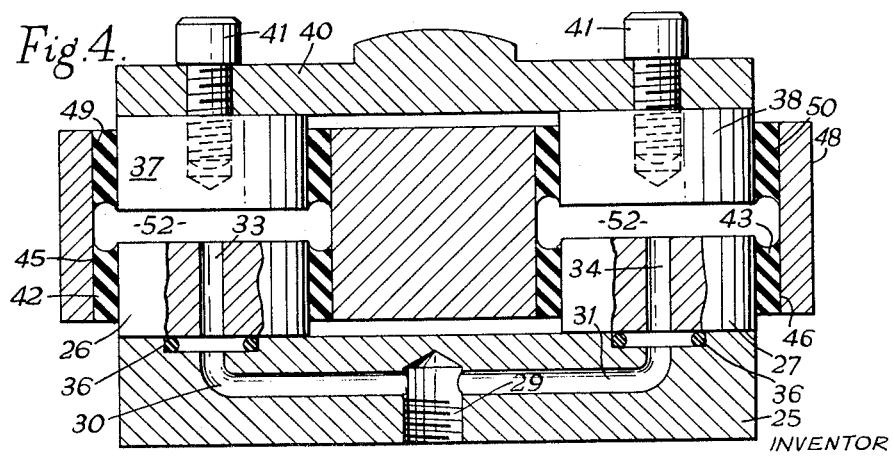
INVENTOR
L. E. BUCK
BY
ATTORNEYS

United States Patent Office 2,981,101
Patented Apr. 25, 1961

2,981,101

HYDRAULIC LOAD CELL

Leon Edwin Buck, Gillingham, England, assignor to Winget Limited, Rochester, Kent, England Filed May 23, 1957, Ser. No. 661,255

Claims priority, application Great Britain May 25, 1956

8 Claims. (Cl. 73—141)

This invention is concerned with hydraulic load cells of the type which are used for measuring, by some form of measuring device, a load applied to a movable member forming part of the cell.

According to the present invention, a hydraulic load cell of the type referred to comprises a support or base member, and one or more load-supporting members or piston members which, or each of which, is coaxial with, supported upon in spaced relationship to and movable vertically relatively to the support and is operatively connected to the latter by means of at least one elastic, fluid-impervious ring which is carried by the load-supporting member and a floating member, which, or part of which encircles the load-supporting member and the support, and also by means of at least one other elastic fluid-impervious ring which is carried by the floating member and the support. The arrangement is such that when the load cell is assembled, a fluid-containing chamber is left between the, or each, movable load-supporting member, the support, the elastic rings and the floating member which chamber is adapted to be connected to a measuring device, such as a pressure gauge, by means of at least one duct formed in the support and connected to the latter by means of at least one elastic, One constructional form of the invention which is described hereinafter comprises a single load-supporting member which is supported upon the support for vertical movement towards and away from the latter by means of a lower elastic fluid-impervious ring which is carried by the support and a floating sleeve, and an upper elastic fluid-impervious ring which is carried by the load-supporting member and the floating sleeve and which is spaced above the lower ring.

A modified construction, which is intended for use in measuring heavy loads and which also is described hereinafter comprises a number of angularly-spaced, load-supporting members spaced radially from the centre of the cell, each of which members is arranged coaxially with, and spaced vertically above, a cylindrical member on the support, and wherein the inner peripheries of elastic, fluid impervious rings are fixed to the cylindrical members and their outer peripheries to the walls of holes passing through a floating sleeve, a like number of elastic, fluid-impervious rings being arranged in the said holes with their inner peripheries fixed to the load-supporting members and their outer peripheries fixed to the said walls, ducts in the support and the cylindrical members being arranged to provide communication between the interiors of the fluid-containing chambers which are formed between the cylindrical members and the load-supporting members and within the upper and lower elastic rings and a duct in the support which is adapted to be connected to the measuring device.

The elastic rings may be made of rubber, synthetic rubber or other resilient, fluid-impervious material and they may be fixed to the members with which they are associated by being arranged in grooves in the members or by bonding to the latter.

Constructional forms of the invention will now be described, by way of example, with reference to the accompanying drawings, wherein:

Fig. 3 is a plan view of a modified construction which comprises three load-supporting pistons carried by a load-supporting plate; and Fig. 4 is a section on the line A—A in Fig. 3.

Figure 1:
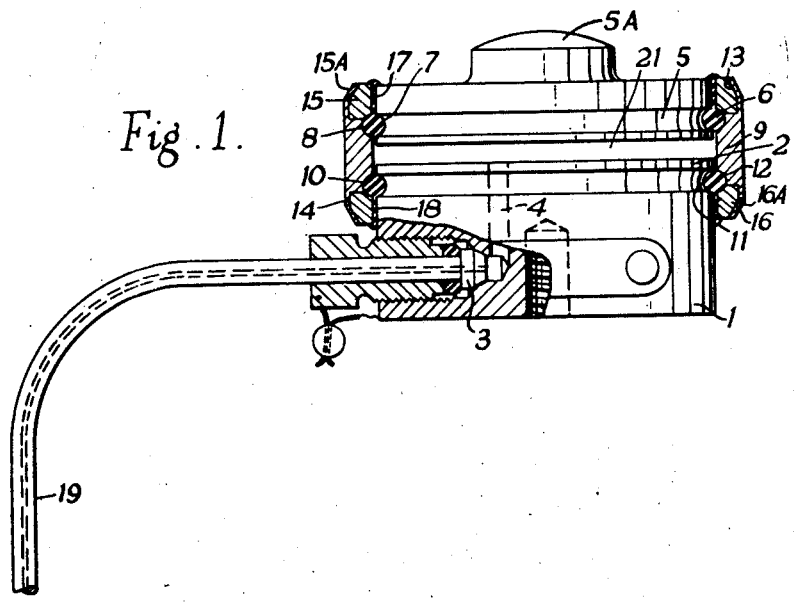
Fig. 1 is a sectional elevation of a load cell comprising a single load-supporting piston.

Referring to Fig. 1:

This constructional form of the invention includes a base 1 provided with a flat machined upper surface 2 and formed with a transverse passage 3 which extends from the periphery of the base inwards towards the centre of the base, where it is connected to the lower end of a vertical passage 4, the upper end of which opens out into the upper surface 2.

The hydraulic load cell also comprises a piston 5 which, when the load cell is assembled, is spaced vertically above the top surface 2 of the base. The inner periphery of a liquid-impervious elastic O-ring 6 made, for example, of rubber or synthetic rubber, is fitted in liquid-tight manner in a groove 7 formed in the piston near the lower face of the latter and the outer periphery of the O-ring is fitted in liquid-tight manner in a groove 8 formed in the inner periphery of a floating sleeve 9, the depth of which is such that the lower edge of the sleeve is located below the upper surface 2 of the base. The inner periphery of a similar liquid-impervious elastic O-ring 10, which also may, for example, be made of rubber or synthetic rubber, is fitted in liquid-tight manner in a groove 11 formed in the base near the upper surface 2 of the latter, the outer periphery of the ring being fitted in a groove 12 formed in the sleeve.

The floating sleeve 9 is machined at its top and bottom ends to provide recesses 13 and 14 into which sealing rings 15 and 16 are respectively fitted. The sealing rings are held in position by turning inwards the thin walls of the sleeve so that they bear against the upper sloping faces 15A and 16A of the rings. After assembly of the rings, the clearances between the sealing rings and the piston 5 and the base 1 are filled in with sleeves 17 and 18 of rubber or synthetic rubber.

The transverse passage 3 in the base 1 is connected by a pipe 19 to a pressure measuring device, such as a pressure gauge having an indicating scale calibrated to suit the load to be measured. The chamber 21 bounded by the piston 5, the base 1, the two elastic O-rings 6 and 10 and the interior of the sleeve 9, the two ducts 3 and 4 in the base and the pipe 19 leading to the measuring device are filled with liquid. The load to be measured is applied to a boss 5A on the piston and because of the elasticity of the O-rings the piston is pressed towards the base and the applied force is reproduced as a unit pressure on the measuring device.

The advantage of using a floating sleeve elastically interposed between the piston and the base is that it allows considerable side movement without a comparative effect on accuracy of load measurement. Further, the deflection of the piston 5 relative to the floating sleeve 9 and the deflection of the sleeve relative to the base 1 are each equal to one half of the total deflection.

Figure 2:
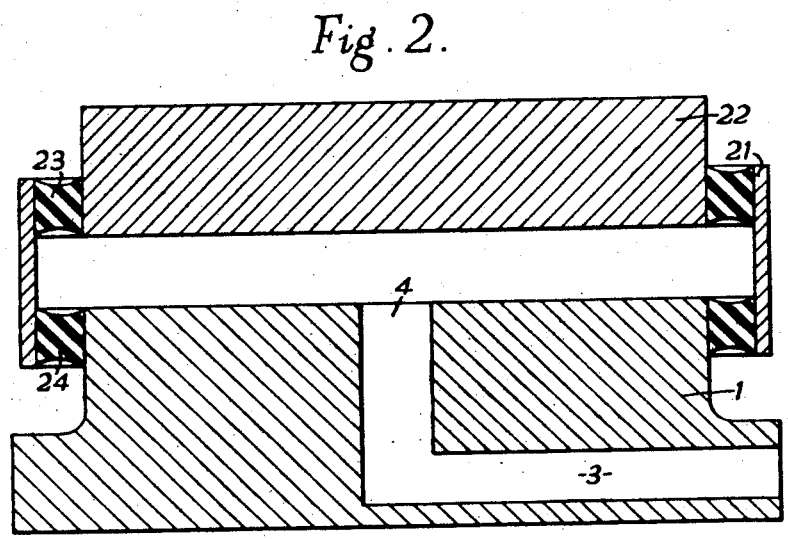
Fig. 2 is an elevation, partly in section, of another construction which also comprises a single load-supporting piston.

In the modified construction shown in Fig. 2, instead of using elastic O-rings fitted in grooves in the floating sleeve 21 and in the piston 22 and the base, the inner peripheries of elastic rings 23 and 24 are respectively bonded to the piston and the base and their outer peripheries are bonded to the floating sleeve 21.

The modified construction shown in Figs. 3 and 4 which is intended for use in measuring heavy loads, comprises a base 25 having a flat upper surface from which a number, in this case three, cylindrical members 26, 27 and 28 project upwards, the cylindrical members being arranged at the same radius from the centre of the base and also spaced equi-distantly angularly from each other. The base is provided with a central duct 29 which is connected to a load-measuring device (not shown) and which, by means of radial ducts 30, 31, 32 connected to it, provides communication between the central duct and vertical passages 33, 34 and 35 formed centrally in the cylindrical members. Leakage of liquid from between the upper surface of the base and the lower surface of each of the cylindrical members is prevented by sealing rings 36 fitted in recesses in the base about the ends of the radial ducts 30, 31 and 32 beneath the cylindrical members.

Three load-supporting members in the form of pistons 37, 38 and 39 are arranged above and coaxially with the cylindrical members 26, 27 and 28, these pistons being fixed to the underside of a load-bearing plate 40 by means of screws 41. In this construction, the cylindrical members 26, 27 and 28 are encircled respectively by lower liquid-impervious elastic rings 42, 43 and 44 which are arranged in holes 45, 46 and 47 drilled right through a floating sleeve 48 in the form of a cylindrical disc. The inner peripheries of the elastic rings are bonded to the cylindrical members while their outer peripheries are bonded to the walls of the said holes but, alternatively, they may be fitted in cooperating grooves in the cylindrical members and the walls of the holes. Similar elastic rings 49, 50 and 51 encircle the pistons, the inner peripheries of the rings being bonded to the pistons and their outer peripheries to the walls of the holes 45, 46 and 47 or, alternatively, the rings may be fitted in cooperating grooves formed in the pistons and the walls of the said holes. Three fluid-containing chambers 52 are thus formed between the three coaxial pistons and cylindrical members and the chambers are connected to the measuring device (not shown) by the passages 33, 34 and 35, the ducts 30, 31 and 32 and the central duct 29. Thus, the load-bearing plate 40 is resiliently supported upon the base by means of the two sets of elastic rings and the floating sleeve.

I claim:

1. A hydraulic load cell, comprising a support, at least one load-supporting member movable vertically relatively to said support, and means operatively connecting said load supporting member to said support and comprising a floating annular sleeve of greater diameter than and overlapping and encircling said load-supporting member and said support, at least one elastic, fluid-impervious ring carried by said load-supporting member and said floating sleeve, and at least one other elastic, fluid-impervious ring carried by said floating sleeve and said support, said supporting member and said support being disposed in spaced relationship, whereby when the load cell is assembled, a fluid-containing chamber is formed between said movable load-supporting member, said support, said elastic rings and said floating sleeve, said support having at least one duct formed therein and connecting said chamber to the exterior of the load cell, said elastic rings being in shear when loaded and deflecting without their deformation affecting the displacement of said chamber.

2. A hydraulic load cell as claimed in claim 1, wherein said elastic rings are made of rubber.

3. A hydraulic load cell as claimed in claim 1, wherein said elastic rings are bonded to said load-supporting member and said support and to said floating sleeve.

4. A hydraulic load cell as claimed in claim 1, wherein said elastic rings are of circular cross-section.

5. A hydraulic load cell, comprising a support, a single load-supporting member, a floating annular sleeve of greater diameter than and overlapping and encircling said load-supporting member and said support, a lower elastic fluid-impervious ring carried by said floating sleeve and said support and supporting said load-supporting member upon said support for vertical movement toward and away from said support, and an upper elastic fluid-impervious ring carried by said load-supporting member and said floating sleeve and spaced from said lower ring, whereby a fluid-containing chamber is formed between said movable load-supporting member, said support, said elastic rings and said floating sleeve, said support having at least one duct formed therein and connecting said chamber to the exterior of the load cell, said elastic rings being in shear when loaded and deflecting without their deformation affecting the displacement of said chamber.

6. A hydraulic load cell as claimed in claim 5, wherein one of said elastic rings is arranged in a groove formed in said support and in a cooperating groove formed in said floating sleeve, while the other elastic ring is arranged in a groove formed in said load-supporting member and in a cooperating groove formed in said floating sleeve.

7. A hydraulic load cell, comprising a support, a plurality of angularly-spaced cylindrical members carried by said support and spaced radially from the center thereof, an equal number of load supporting members, each of said load-supporting members being coaxial with and spaced vertically above a separate cylindrical member, a plurality of elastic, fluid impervious rings, the inner peripheries of said rings being fixed to said cylindrical members, a disc-shaped member having a plurality of angularly-spaced holes formed therein, each of said holes encircling said load-supporting members and said cylindrical members, the outer peripheries of said rings being fixed to the walls of said holes, a like number of elastic fluid-impervious rings arranged in said holes, the inner peripheries of said rings being fixed to said load-supporting members and the outer peripheries of said rings being fixed to said walls, said support having ducts communicating with said cylindrical members, whereby fluid-containing chambers are formed between said cylindrical members and said load-supporting members and within said upper and lower elastic rings, said ducts providing communication between the interiors of said chambers, and the exterior of the load cell.

8. A hydraulic load cell as claimed in claim 7, wherein said elastic rings are bonded to said load-supporting members, said cylindrical members, said walls and said floating sleeve.

References Cited in the file of this patent

UNITED STATES PATENTS

| 203,127 | Eltting | Apr. 30, 1878 |
| 1,755,849 | Temple | Apr. 22, 1930 |
| 2,320,191 | Mott | May 25, 1943 |
| 2,531,104 | Bohannan | Nov. 21, 1950 |

FOREIGN PATENTS

| 605,558 | Great Britain | July 27, 1948 |